US008029257B2

(12) United States Patent
Caretta (10) Patent No.: US 8,029,257 B2
(45) Date of Patent: Oct. 4, 2011

(54) METHOD AND APPARATUS FOR MOULDING AND CURING TYRES FOR VEHICLE WHEELS

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 134 days.

(21) Appl. No.: 12/543,737

(22) Filed: Aug. 19, 2009

(65) Prior Publication Data

US 2009/0309265 A1    Dec. 17, 2009

Related U.S. Application Data

(60) Division of application No. 10/025,787, filed on Dec. 26, 2001, now Pat. No. 7,597,837, which is a continuation of application No. PCT/EP00/05389, filed on Jun. 13, 2000.

(60) Provisional application No. 60/147,027, filed on Aug. 3, 1999.

(30) Foreign Application Priority Data

Jun. 25, 1999    (EP) .................................... 99830405

(51) Int. Cl.
   *B29C 35/02*    (2006.01)
(52) U.S. Cl. ........................................... 425/44; 425/49
(58) Field of Classification Search .................... 425/36, 425/44, 49
   See application file for complete search history.

(56) References Cited

U.S. PATENT DOCUMENTS 1,328,676 A    1/1920 Krannich
           (Continued)

FOREIGN PATENT DOCUMENTS

DE    355 909 C    7/1922
           (Continued)

OTHER PUBLICATIONS

English-language Abstract of EP 0 242 840 (corresponds to U.S. Patent No. 4,895,692), Oct. 28, 1987.

*Primary Examiner* — James Mackey
(74) *Attorney, Agent, or Firm* — Finnegan, Henderson, Farabow, Garrett & Dunner, L.L.P.

(57)    ABSTRACT

A method of molding and curing tires for vehicle wheels includes the steps of disposing a tire being processed on a toroidal support, enclosing the tire and the toroidal support inside a molding cavity defined in a vulcanization mould, pressing the outer surface of the tire against the molding cavity walls, and administering heat to the tire to cause molecular crosslinking of the tire. The pressing step includes the steps of compressing side portions of the tire between the molding cavity walls and the outer surface of the toroidal support, concurrently with the closing step, and imposing an expansion to a radially-outer portion of the tire to bring the radially-outer portion of the tire against the walls of the molding cavity.

19 Claims, 5 Drawing Sheets

U.S. PATENT DOCUMENTS

| | | | |
|---|---|---|---|
| 1,362,169 A | * | 12/1920 | MacBeth .................. 425/44 |
| 1,400,258 A | * | 12/1921 | Binns ..................... 425/44 |
| 1,407,839 A | | 2/1922 | Clinefelter et al. |
| 1,652,020 A | * | 12/1927 | Laursen .................. 425/44 |
| 1,798,210 A | | 3/1931 | Laursen |
| 2,987,769 A | | 6/1961 | Fröhlich |
| 3,887,313 A | | 6/1975 | Jaedicke et al. |
| 4,400,342 A | | 8/1983 | Logan |
| 4,895,692 A | | 1/1990 | Laurent et al. |
| 6,332,999 B1 | | 12/2001 | Caretta |
| 6,350,402 B1 | | 2/2002 | Kobayashi |
| 6,479,008 B1 | | 11/2002 | Caretta |

FOREIGN PATENT DOCUMENTS

| | | |
|---|---|---|
| EP | 0 976 533 A2 | 2/2000 |
| EP | 0 976 534 A2 | 2/2000 |
| EP | 0 978 370 A2 | 2/2000 |
| GB | 150373 A | 9/1920 |

* cited by examiner

METHOD AND APPARATUS FOR MOULDING AND CURING TYRES FOR VEHICLE WHEELS

CROSS-REFERENCE TO RELATED APPLICATIONS

This application is a divisional of U.S. application Ser. No. 10/025,787, filed Dec. 26, 2001, now U.S. Pat. No. 7,597,837 which is a continuation under 35 U.S.C. §111(a) of, and (1) claims the benefit of priority of, PCT International Application No. PCT/EP00/05389, filed Jun 13, 2000, in the European Patent Office, (2) claims the benefit of priority under 35 U.S.C. §119(a)-(d) of European Patent Application No. 99830405.9, filed Jun 25, 1999, in the European Patent Office, and (3) claims the benefit of priority under 35 U.S.C. §119(e) of U.S. Provisional Application No. 60/147,027, filed Aug 3, 1999. The subject matter of the disclosures of U.S. application Ser. No. 10/025,787, PCT International Application No. PCT/EP00/05389, European Patent Application No. 99830405.9, and U.S. Provisional Application No. 60/147,027, is incorporated herein by reference.

BACKGROUND

1. Field of the Disclosure

The present invention relates to a method of moulding and curing tyres for vehicle wheels, comprising the following steps: disposing a tyre being processed on a toroidal support the outer surface of which substantially mates an inner surface of the tyre itself; closing the tyre and the toroidal support inside a moulding cavity defined in a vulcanization mould, said moulding cavity having walls the shape of which matches that of an outer surface of the tyre when vulcanization has been completed; pressing the tyre by its outer surface against the moulding cavity walls; administering heat to the tyre being processed to cause a molecular crosslinking of same.

The invention also relates to an apparatus for moulding and curing tyres for vehicle wheels, comprising: a toroidal support arranged to engage a tyre being processed, said toroidal support having an outer surface substantially mating an inner surface of the tyre itself; a vulcanization mould arranged to receive the toroidal support carrying the tyre being processed within a moulding cavity having a tyre-holding space delimited between the outer surface of the toroidal support and walls of the moulding cavity itself mating an outer surface of the cured tyre; pressing devices for pressing the outer surface of the tyre against the inner wall of the mould; heating devices for transmitting heat to the tyre enclosed in the moulding cavity.

In a tyre production cycle it is provided that, after a manufacturing process in which the different tyre components are made and/or assembled, a moulding and curing process should be carried out for the purpose of stabilizing the tyre structure to a given geometric conformation, generally characterized by a particular tread pattern.

To this aim, the tyre is introduced into a vulcanization mould usually comprising a pair of cheeks adapted to be axially moved close to each other, which are arranged to operate on the tyre bead and sidewalls, and at least one crown of circumferentially distributed sectors susceptible of being radially moved close to each other so as to operate at the tyre tread band. In more detail, cheeks and sectors are mutually movable between an open condition, in which they are spaced apart from each other to enable loading of the tyres being processed, and a closed condition in which they define a moulding cavity the geometric conformation of which is the same as the outer surfaces of the tyre to be obtained.

In one of the most widespread moulding methods it is provided that a vulcanization bladder of elastomer material filled with high-temperature and high-pressure steam and/or another fluid should be inflated at the inside of the tyre enclosed in the moulding cavity. In this manner the tyre is conveniently urged against the inner walls of the moulding cavity and stabilized to the geometric configuration imposed to it, following a molecular crosslinking to which the elastomer material of which it is made is subjected, due to heat transmitted by the fluid through the bladder and by the mould walls.

Also known are moulding methods in which, instead of an inflatable vulcanization bladder, a rigid toroidal support having the same configuration as the inner surface of the tyre to be obtained is arranged within the tyre.

2. Description of Related Art

Such a method is disclosed for example in the European Patent EP 242 840 in which a rigid toroidal support is employed for imposing an appropriate shape and definitive sizes to a tyre enclosed in the mould. According to the above patent disclosure, the different coefficient of thermal expansion between the toroidal metal support and the raw elastomer material of which the tyre is made is utilized for achieving an appropriate moulding pressure.

In conclusion, the assembly of the parts forming the mould and the toroidal support define a closed space in the moulding cavity which is exactly shaped like the whole geometric configuration of the tyre. In this way, both the outer surfaces and the inner surfaces of the tyre are maintained in contact with rigid portions of the moulding and curing apparatus. In other words, all parts of the apparatus that are intended for setting the final tyre geometry are rigid parts, in contrast with the methods using an inflatable vulcanization bladder that, as known, constitutes a deformable portion of the mould.

It is the Applicant's perception that, at the present state of the art, both the methods using an inflatable vulcanization bladder and the methods using a rigid toroidal support during tyre vulcanization have some problems.

With reference to the methods using an inflatable bladder, it is in fact to be noted that the bladder deformability can easily give rise to geometric and/or structural imperfections in the tyre due to possible distortions suffered by the bladder itself, following an unbalanced expansion for example, and/or due to friction phenomena generated between the outer surfaces of the bladder and the inner surfaces of the green tyre.

Since on the bladder itself also relies the task of locking the tyre beads against the corresponding mould portions, the bladder deformability makes it difficult to reach sufficiently high pressures for bead locking. Thus, undesired misalignments of the beads relative to the geometric axis of the tyre may occur, giving then rise to distortions of the whole tyre structure. In addition, an insufficient pressure for bead locking may cause formation of flashes at the beads, due to leakage of the elastomer material between the bladder and the mould, above all at the starting instants of the vulcanization process.

The vulcanization bladder needs use of important amounts of steam since the whole inner volume of the bladder inflated in the mould cavity is to be filled up, and in addition it constitutes an obstacle to transmission of heat to the tyre by steam itself.

On the other hand, use of a rigid toroidal support instead of the inflatable vulcanization bladder makes it necessary to carry out a very precise and difficult checking of the volumes of the material employed in manufacturing the tyre.

In addition, it is presently impossible to impose an appropriate radial and/or circumferential expansion to the tyre, for achieving desired preloading effects in the reinforcing structures employed in the tyre manufacture, for example.

Furthermore, even with the aid of the rigid toroidal support, achievement of a correct and efficient heat transmission to the inside of the tyre is rather difficult.

U.S. Pat. No. 1,798,210 discloses a curing method according to which a previously-manufactured green tyre is fitted on a toroidal support made of vulcanized rubber, to be then closed in the moulding cavity defined in a vulcanization mould. The toroidal support is completely hollow and is such shaped and sized that it cooperates with the inner walls of the moulding cavity to carry out a hermetic seal at the inner circumferential edges of the tyre. The toroidal support sizes however are smaller than the inner sizes of the green tyre, so as to define a gap extending from one bead to the other between the outer surfaces of the toroidal support and the inner surfaces of the green tyre. After carrying out the closure of the mould, hot water and/or another hot fluid under pressure is admitted to the toroidal support, which fluid reaches the above described gap through openings formed in the toroidal support for fulfilling all functions required for tyre moulding and curing.

In this curing process, however, manufacturing of the tyre directly on the toroidal support to be introduced into the vulcanisation mould together with the tyre itself is neither provided nor allowed.

In addition, since the toroidal support necessarily has smaller sizes than the inner sizes of the tyre, structural defects may easily arise, which result from an imperfect centering and/or uncontrolled movements or distortions to which the tyre is submitted on its being closed in the moulding cavity.

The Applicant has perceived that important improvements may be achieved if admission of working fluid, for carrying out tyre moulding and/or heat supply for vulcanization, takes place at the inside of a gap which is formed between the toroidal support and the green tyre only following an expansion imposed to the tyre by effect of pressure. A method and an apparatus conceived on the basis of this principle are the object of a European Patent Application No. 98830473.9 in the name of the same Applicant.

SUMMARY

In accordance with the present invention, it has also been found that important improvements may be achieved as regards tyre expansion, with advantageous effects in terms of qualitative features of the final product, if concurrently with the expansion imposed to the tyre, the tyre side portions included, by way of example, between the tyre beads and the transition regions between the sidewalls and the tread band are firmly held between the inner walls of the moulding cavity and the outer surface of the toroidal support. In this way, the tyre expansion effect and consequent stretching of the cords forming the carcass and belt structures, is advantageously concentrated on the radially outer region of the tyre itself, close to the tread band.

In more detail, it is an object of the invention to provide a method of moulding and curing tyres for vehicle wheels, characterized in that said pressing step comprises the following actions: compressing side portions of the tyre, extending away from the inner circumferential edges thereof, between the walls of the moulding cavity and the outer surface of the toroidal support, concurrently with said closing step; imposing an expansion to a radially outer portion of the tyre, delimited between said side portions, to bring said radially outer portion against the inner walls of the moulding cavity.

In particular, tyre expansion is preferably provided to be carried out through a step of admitting a fluid under pressure to at least one fluid-diffusion interspace created between the outer surface of the toroidal support and the inner surface of the tyre.

Advantageously, before admission of fluid under pressure the inner surface of the tyre substantially adheres, over its whole extension, to the outer surface of the toroidal support, said diffusion interspace being created following tyre expansion.

Admission of fluid under pressure is preferably carried out through feeding channels formed in the toroidal support and opening onto the outer surface of the latter.

Before said pressing step, it may be advantageously provided that a performing step of the tyre should be carried out by preliminary admission of a working fluid between said outer surface of the toroidal support and the inner surface of the tyre, under a lower pressure than that of the pressurized fluid admitted during the pressing step.

Preferably, heat administration takes place by admission of a heating fluid to said diffusion interspace, said heating fluid comprising the same fluid under pressure as employed for carrying out the pressing step.

In more detail, fluid under pressure is introduced into an upper portion of the moulding cavity and guided along an inner surface of the toroidal support towards a lower portion of the cavity itself.

Concurrently with said introduction step, a step of drawing said fluid under pressure out of the lower portion of the moulding cavity is also preferably carried out, so as to create a pressurized fluid stream along the inner surface of the toroidal support and the diffusion interspace.

In accordance with a preferred embodiment, a rotational movement around a geometric axis of the toroidal support is imparted to the fluid under pressure introduced into the moulding cavity.

Preferably said diffusion interspace has an extension of between 3 mm and 14 mm, measured between the inner surface of the tyre and the outer surface of the toroidal support at least at an equatorial plane of the tyre itself.

It is also preferably provided that said expansion should involve an increase in the tyre circumference included between 1% and 3.5% measured at an equatorial plane (X-X) of the tyre itself.

Still in accordance with the present invention, the step of disposing the tyre on the toroidal support is preferably carried out by directly manufacturing the tyre on the toroidal support.

Advantageously, before the step of admitting fluid under pressure, treatment of the inner surface of the tyre may be carried out for preventing permeation of the pressurized fluid through the elastomer material forming the green tyre.

In more detail, a prevulcanized liner is directly formed on the toroidal support during a preliminary step of the tyre manufacture, to prevent permeation of said pressurized fluid through the elastomer material forming the green tyre.

It is a further object of the invention to provide an apparatus for moulding and curing tyres for vehicle wheels, characterized in that, under said closed condition, said holding space has radially inner portions having shape and sizes substantially corresponding to the shape and sizes of side portions of the tyre, extending away from inner circumferential edges of same, and a radially outer portion having radial dimensions greater than the radial dimensions of a radially outer portion of the tyre extending between the side portions of the tyre itself.

In more detail, said pressing devices comprise channels for feeding a fluid under pressure which are formed through the toroidal support and open into the outer surface of said support.

Advantageously, said holding space when the mould is closed has a volume greater than the volume taken up by the tyre itself.

It is further preferably provided that said feeding channels should open into at least one interspace for diffusion of the fluid under pressure, defined in the radially outer portion of said holding space, between the outer surface of the toroidal support and the inner surface of the tyre being processed.

Advantageously, the outer surface of the toroidal support has an extension lower than the extension of the inner surface of the vulcanized tyre.

It is also preferably provided that said pressing devices should comprise at least one guide duct for said fluid under pressure extending along an inner surface of the toroidal support and terminating at said feeding channels.

In particular, said guide duct is delimited between the inner surface of the toroidal support and a filling structure fastened to the inside of the toroidal support itself.

Said filling structure preferably has an outer surface substantially extending parallelly of the inner surface of the toroidal support.

In more detail, the filling structure comprises an upper portion having an outer surface substantially parallel to the inner surface of the toroidal support, and a lower portion having a base surface with a slightly inclined orientation relative to a horizontal plane.

Said pressing device may also comprise circumferentially-distributed admission nozzles oriented towards an end of said guide duct.

Preferably, said admission nozzles are oriented towards an inlet end of said guide duct, disposed above an equatorial plane of the toroidal support.

In more detail, said nozzles have an inclined orientation relative to a direction radial to a geometric axis of the toroidal support.

In a preferential embodiment, at least a first and a second series of said feeding channels are provided, said channels being located at respectively opposite positions relative to an equatorial median plane of the toroidal support and oriented towards directions respectively converging away from a geometric axis of the toroidal support.

It is also preferably provided that said toroidal support should have at least one centering shank for engagement in a centering seating associated with the mould for fixing the positioning of the toroidal support and of the tyre in the moulding cavity.

Advantageously, said centering shank extends along a geometric axis common to said toroidal support, to said tyre being processed and to said moulding cavity.

Still in accordance with the present invention, said heating devices preferably comprise at least one duct to send a heating fluid to the feeding channels.

Advantageously, said heating fluid comprises the same fluid under pressure as admitted from the pressurized-fluid feeding devices.

It is also preferably provided that said toroidal support should have a structure elastically yielding in an axial direction, at least at regions corresponding to inner circumferential edges of the tyre.

In more detail, said toroidal support preferably has a structure elastically yielding in an axial direction at regions corresponding to the side portions of the tyre.

BRIEF DESCRIPTION OF THE DRAWINGS

Further features and advantages will become more apparent from a detailed description of a preferred, but non-exclusive, embodiment of a method and an apparatus for moulding and curing tyres for vehicle wheels, in accordance with the present invention. This description will be set forth hereinafter with reference to the accompanying drawings, given by way of non-limiting example, in which.

DETAILED DESCRIPTION OF EXEMPLARY EMBODIMENTS

With reference to said drawings, an apparatus for moulding and curing tyres for vehicle wheels in accordance with the present invention has been generally identified by reference numeral 1.

Apparatus 1 comprises a vulcanization mould 2 associated with a vulcanisation press 3, only diagrammatically shown because it can be made in any manner convenient for a person skilled in the art. For instance, mould 2 may consist of a lower half 2a and an upper half 2b in engagement with a bedplate 3a and a closing portion 3b of press 3, respectively.

In the example, each of the lower 2a and upper 2b halves of mould 2 has a lower cheek 4a and an upper cheek 4b respectively, and a lower 5a and upper 5b crown of sectors.

Figure 1:
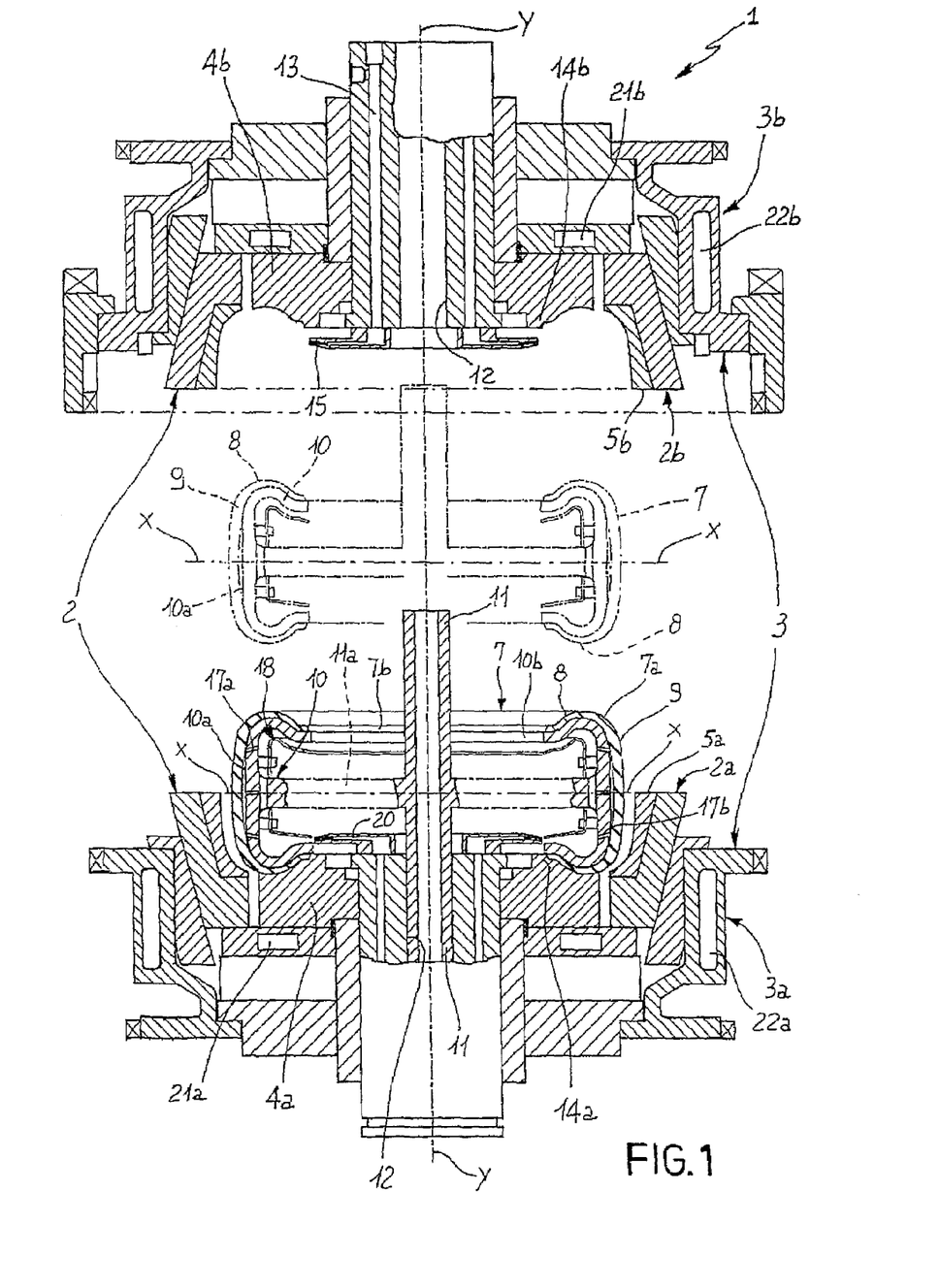
FIG. 1 diagrammatically shows a diametrical section of an apparatus in accordance with the invention with a mould arranged in an open condition to enable removal of a vulcanized tyre.
Figure 2:
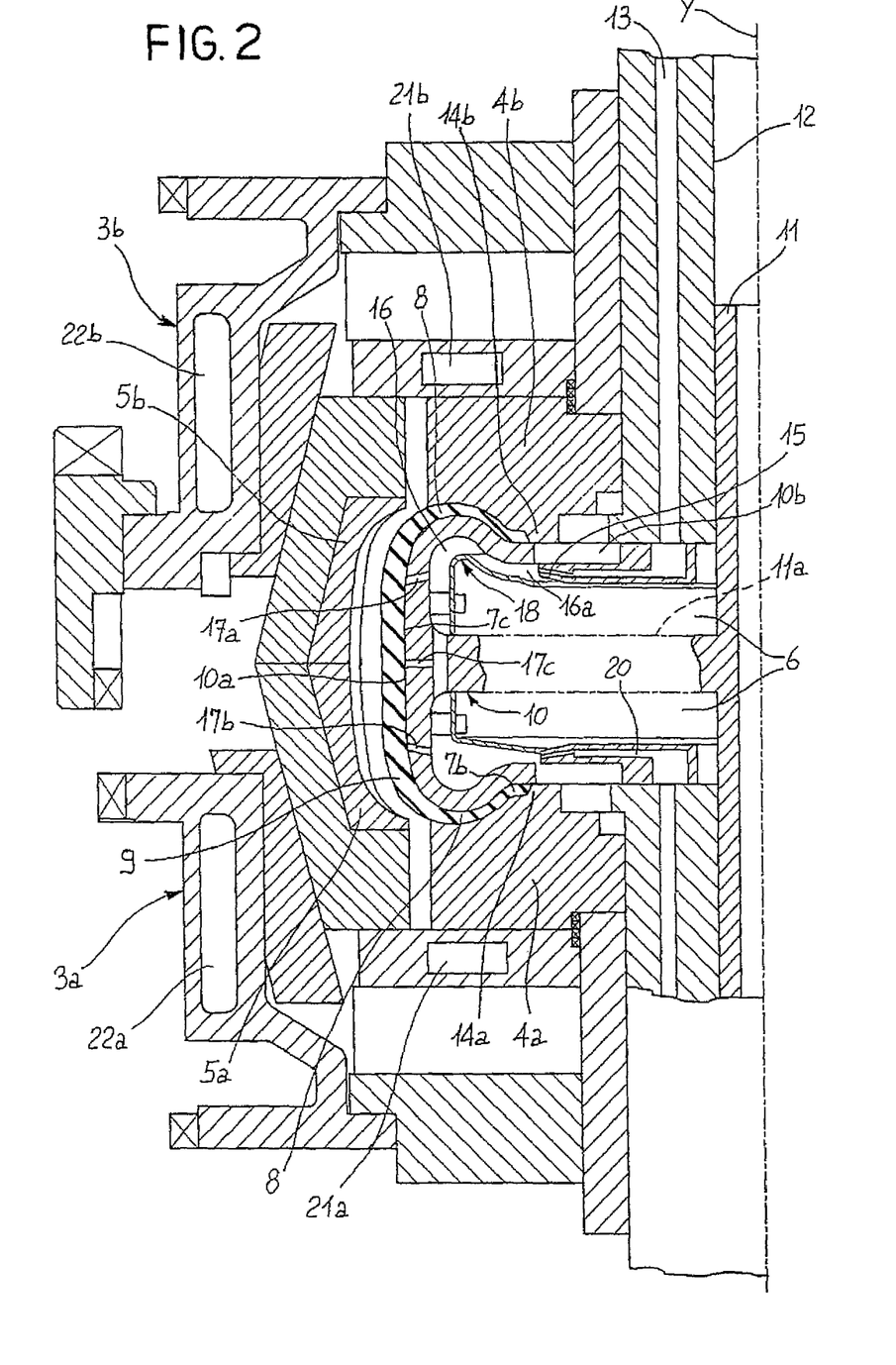
FIG. 2 is a fragmentary cross-section half, represented in an enlarged scale relative to FIG. 1, showing a green tyre during an operating step in which mould closing has begun through movement of the cheeks close to the toroidal support.
Figure 3:
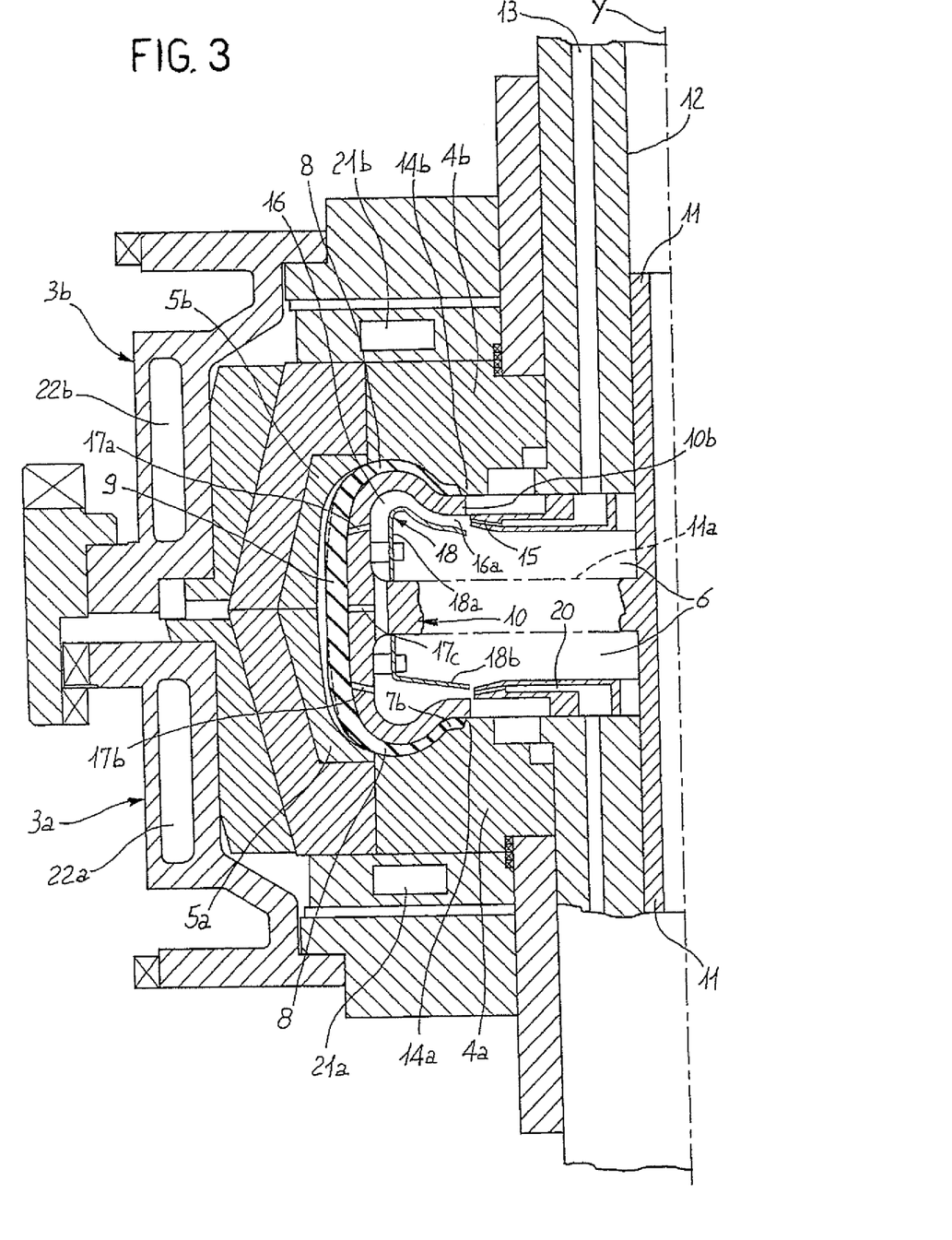
FIG. 3 is a cross-section half of the tyre during an operating step in which, following radial approaching of the sectors, closure of the mould has been completed.
Figure 4:
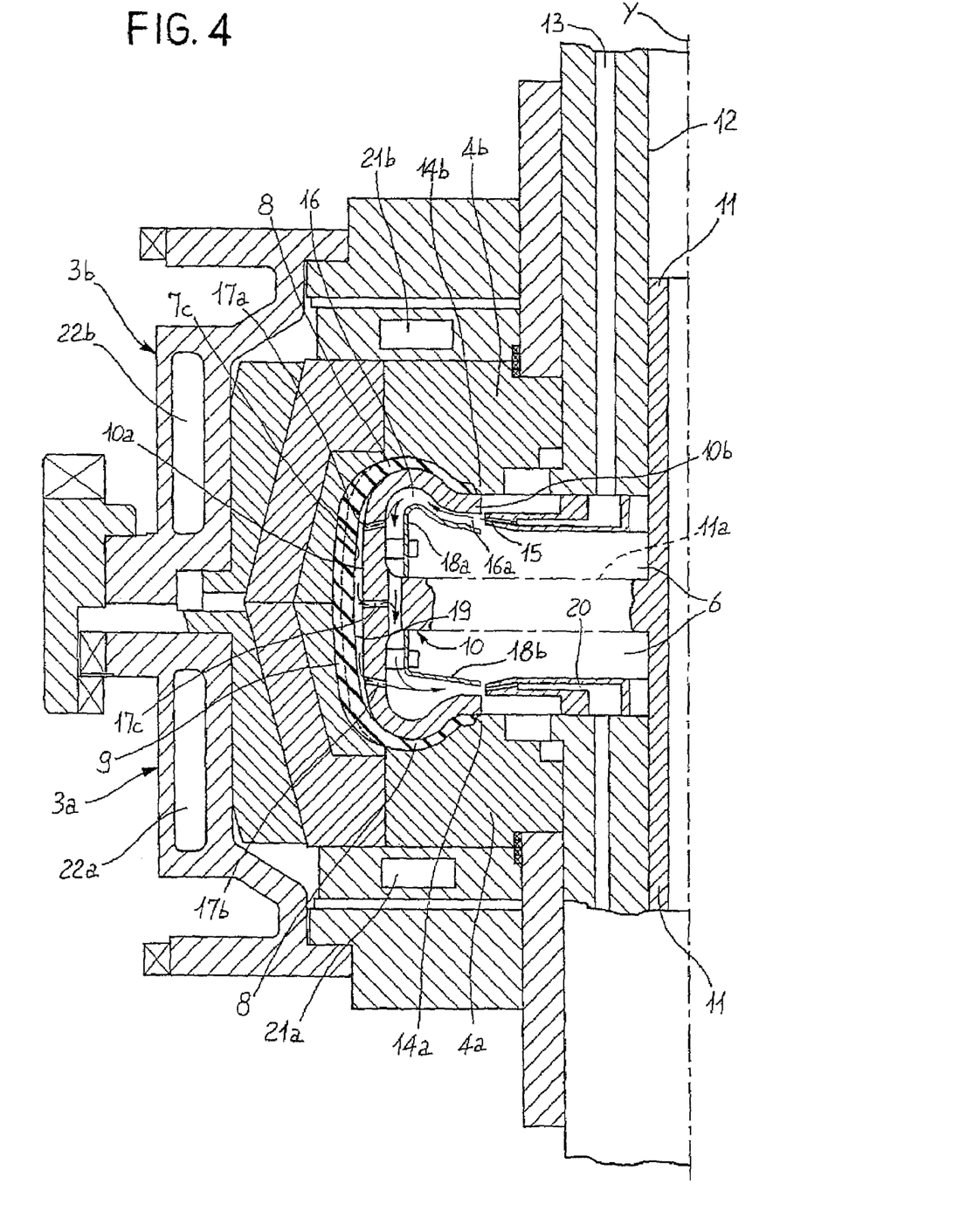
FIG. 4 is a cross-section half of the tyre being moulded against the mould surfaces following admission of steam under pressure into the moulding cavity.

Lower 2a and upper 2b halves are mutually movable between an open condition in which they are mutually spaced apart as shown in FIG. 1, and a closed condition, shown in FIGS. 2 to 4, in which they are placed close to each other to form a moulding cavity 6 delimited by the inner walls of mould 2 defined by cheeks 4a, 4b and by sectors 5a, 5b. The inner walls of mould 2 have a shape matching the geometric conformation of outer surface 7a of a tyre 7 to be obtained.

Tyre 7 usually has a carcass structure, preferably of the radial type, formed of one or more carcass plies having the respective opposite end edges in engagement with annular reinforcing structures incorporated into inner circumferential edges 7b of the tyre itself, i.e. into the regions usually identified as "beads".

Two side portions 8 extending away from beads 7b and a radially outer portion 9 confined between said side portions can be identified in the carcass structure and, more generally, in the whole structure of tyre 7.

Applied to the carcass structure, at radially outer portion 9 thereof, is a belt structure comprising one or more belt layers disposed successively and radially superposed on each other.

The carcass and belt structures, as well as the annular reinforcing structures at the beads, have not been shown in the accompanying drawings as they can be made in any convenient manner.

Cheeks 4a, 4b are intended for forming the outer surfaces of the opposite sidewalls of tyre 7, extending at side portions 8, whereas sectors 5a, 5b are intended for acting at radially outer portion 9, to form the so-called tread band of the tyre itself, by creating a series of cuts and longitudinal and/or transverse grooves (not shown in the drawings) therein, suitably disposed so as to form a desired "tread pattern".

Apparatus 1 further involves use of at least one toroidal support 10 of metal material or another solid material, having an outer surface 10a reproducing or at all events substantially matching the shape of an inner surface of tyre 7 to be submitted to the moulding and curing treatment. Toroidal support 10 conveniently consists of a collapsible drum, i.e. a drum made up of centripetally movable circumferential segments so that the toroidal support itself can be disassembled and easily removed from tyre 7 when the tyre manufacture has been completed.

In accordance with the method of the invention, green tyre 7 is disposed on toroidal support 10 before the latter is inserted, together with the tyre itself, into vulcanization mould 2 arranged in an open condition.

In particular, engagement of tyre 7 on toroidal support 10 can be conveniently obtained by manufacturing the tyre directly on the support itself. In this way toroidal support 10 is advantageously utilized as a rigid model for formation and/or deposition of the different components, such as carcass plies, reinforcing structures at the beads, belt layers, sidewalls and tread band, cooperating in forming the tyre itself. Further details about the modalities of forming and/or laying down components of tyre 7 on toroidal support 10 can be found, for example, in the European Patent Applications issued under Nos. EP 0928680 and EP 0928702 respectively, in the name of the same Applicant.

Under this circumstance, the geometric conformation of the inner surface of green tyre 7 will exactly correspond to, or at all events will substantially mate, the conformation of the outer surface of toroidal support 10. In other words, toroidal support 10 and tyre 7 are in mutual contact relationship substantially in a homogeneous manner over the whole extension of their outer 10a and inner surfaces, respectively.

However, as better clarified in the following, the extension of outer surface 10a of toroidal support 10 is preferably provided to be conveniently lower than the extension of inner surface 7b of tyre 7 when vulcanization has been completed.

Toroidal support 10 is preferably provided with at least one centering shank 11 for engagement in a centering seating 12 arranged in mould 2, for establishing a precise positioning of the toroidal support itself and of tyre 7 carried by it within moulding cavity 6. In the embodiment shown, toroidal support 10 has two centering shanks 11 extending from opposite sides along a geometric axis Y common to toroidal support 10, to tyre 7 and to moulding cavity 6, and arranged to be fitted into corresponding centering seatings 12 formed in bedplate 3a and closing portion 3b of vulcanization press 3, respectively.

Centering shanks 11 can be connected to toroidal support 10 by connecting linkages 11a (only diagrammatically shown) adapted to enable a centripetal movement of said circumferential segments forming the toroidal support itself.

After toroidal support 10 with tyre 7 has been positioned on lower portion 2a of mould 2, the mould is brought to its closed condition.

As clearly shown in the accompanying drawings, following closure of mould 2 tyre 7 is enclosed in a holding space confined between outer surface 10a of toroidal support 10 and the inner walls of moulding cavity 6.

Advantageously, this holding space when the mould is closed has a volume greater than the volume taken up by the tyre itself. In more detail, as can be easily deduced from the accompanying figures, the holding space has two radially inner portions of shape and sizes substantially corresponding to the shape and sizes of side portions 8 of tyre 7 and a radially outer portion confined between said radially inner portions, of radial dimensions greater than the radial dimensions, i.e. thickness, measured on radially outer portion 9 of the tyre itself.

In a starting step of mould 2 closure, each of lower 4a and upper 4b cheeks is brought to act against the outer surfaces of tyre 7 at one of side portions 8 of the tyre itself, as clearly shown in FIG. 2.

Under this situation, each of side portions 8 of tyre 7 is included between the walls of moulding cavity 6 corresponding to cheeks 4a, 4b and outer surface 10a of toroidal support 10.

Simultaneously, each of inner circumferential edges 7b of tyre 7 is sealingly engaged between inner circumferential portions 10b of toroidal support 10 and inner annular portions 14a, 14b of lower 4a and upper 4b cheeks, usually called "bead rings". In more detail, between bead ring 14a, 14b of each cheek 4a, 4b and corresponding inner circumferential portion 10b of toroidal support 10, a housing seat for inner circumferential edge 7b of tyre 7, usually known as tyre "bead", is defined.

Said bead seats 14a, 14b give respective beads 7b a moulding of the greatest geometric accuracy and thickness, because it results from direct coupling between the rigid surfaces of toroidal support 10 and cheeks 4a, 4b of mould 2.

In addition, said bead seats ensure a very steady and precise centering of tyre 7 relative to axis "Y" of moulding cavity 6.

Preferably, toroidal support 10 is also such sized that at least at the regions corresponding to beads 7b of tyre 7 it has a structure elastically yielding in an axial direction, following mutual approaching of cheeks 4a, 4b during the closing step of mould 2.

In particular, toroidal support 10 is conveniently elastically yielding in an axial direction at the regions corresponding to the whole extension of tyre side portions 8 submitted to a compression action between cheeks 4a, 4b and the toroidal support itself.

In more detail, the axial deformation to which toroidal support 10 is submitted at the contact regions with cheeks 4a, 4b close to tyre beads 7b is preferably included between 0.3 and 0.5 mm, and is of such an extent that it generates a specific pressure included between 18 and 25 bar on the contact surfaces with corresponding cheeks 4a, 4b. This contact pressure, during the starting moulding and curing steps of tyre, prevents any leakage of the elastomer material between the surfaces mutually in contact of toroidal support 10 and of cheeks 4a, 4b, thereby avoiding formations of consequent flashes. Following mutual approaching of cheeks 4a, 4b or concurrently with approaching of the same, closing of mould 2 is completed through radial approaching of sectors 5a, 5b while they move close to toroidal support 10.

As can be seen in FIG. 3, at the moment that closure of mould 2 is completed the walls of moulding cavity 6 close to sectors 5a, 5b keep to some distance from the outer surface of tyre 7, whereas the inner surface of the tyre adheres to outer surface 10a of toroidal support 10 substantially over the whole extension thereof.

In this step, the tread band disposed at radially outer portion 9 of tyre 7 can at all events be partly penetrated by ridges arranged on sectors 5a, 5b, particularly close to the so-called tyre "shoulders", i.e. at the transition regions between the tyre sidewalls and tread band.

The pressing action of tyre 7 against the inner walls of moulding cavity 6, the beginning of which took place with compression of side portions 8 between cheeks 4a, 4b and toroidal support 10, is carried out also at radially outer portion 9 of tyre 7, concurrently with heat administration to cause molecular crosslinking of the elastomer material of which the tyre is made and consequent geometric and structural stabilization of the tyre itself.

To this purpose, apparatus 1 is provided with pressing devices comprising at least one primary duct 13 for feeding fluid under pressure, formed for example in closing portion 3b of press 3 and opening into moulding cavity 6 to send a fluid under pressure into said cavity, at a radially inner position relative to toroidal support 10.

A plurality of channels 17a, 17b, 17c for feeding fluid under pressure extends through toroidal support 10, these channels opening onto outer surface 10a of the toroidal support and being conveniently distributed on the circumferential extension of same.

In more detail, at least a first and a second series of feeding channels 17a, 17b are preferably provided, said series being disposed at respectively opposite positions relative to equatorial median plane X-X of toroidal support 10 and oriented in respectively converging directions away from geometric axis Y, for the purposes better clarified in the following. At least a third series of feeding channels 17c circumferentially distributed in median equatorial plane X-X may also be provided.

Figure 5:
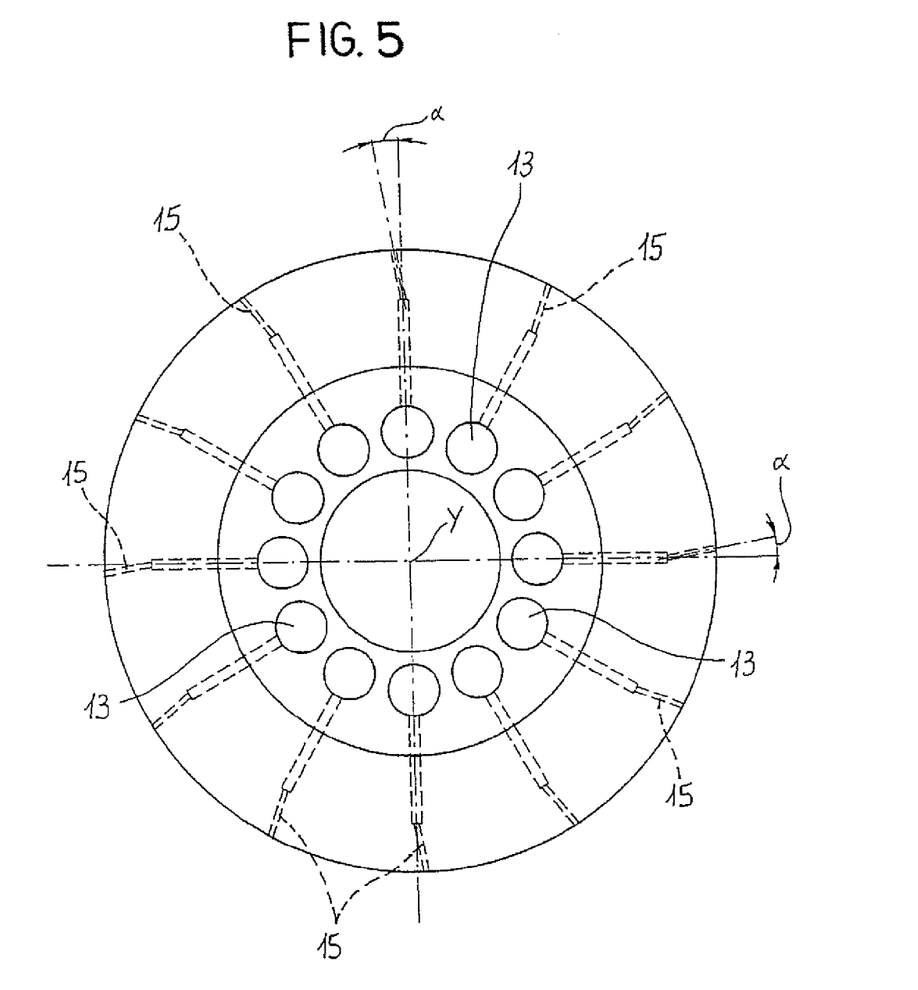
FIG. 5 is a diagrammatic plan view showing distribution of the working-fluid admission nozzles relative to the geometric axis of the mould and of the toroidal support.

The pressurized fluid fed from primary duct 13 is sent to moulding chamber 6 through a plurality of circumferentially distributed admission nozzles 15. As clearly illustrated in FIG. 5, these admission nozzles can advantageously have an inclined orientation, preferably at an angle $\alpha$ included between 15° and 45°, relative to a direction radial to geometric axis Y of moulding cavity 6, to give the working fluid under pressure a rotation movement around the geometric axis itself.

In addition, admission nozzles 15 disposed at the upper portion of moulding cavity 6 are advantageously provided to be directed towards inlet end 16a of a guide duct 16 extending along the inner surface of toroidal support 10 and connected to feeding channels 17. This guide duct 16 is advantageously confined between the inner surface of toroidal support 10 and a filling structure 18, preferably made of sheet metal and fastened to the inside of the toroidal support. As clearly shown in the drawings, filling structure 18 has an outer surface extending substantially parallel to the inner surface of toroidal support 10. In particular, filling structure 18 has an upper portion 18a having an outer surface parallel to the inner surface of toroidal support 10 and a lower portion 18b having a base surface slightly inclined relative to a horizontal plane, which extends between the radially outer and radially inner ends of the filling structure itself following a descending direction towards geometric axis Y. Due to the presence of this base surface, storage of condensate within filling structure 18 is advantageously avoided.

The pressurized fluid distributed from admission nozzles 15 runs through guide duct 16 and therefore reaches outer surface 10a of toroidal support 10, via feeding channels 17a, 17b, 17c.

Pressure exerted by the fluid causes tyre 7, which has its side portions 8 sealingly sandwiched between toroidal support 10 and cheeks 4a, 4b, to expand at its radially outer portion 9 in the holding space defined between the walls of moulding cavity 6 and outer surface 10a of toroidal support 10. Thus, between the inner surface of tyre 7 and outer surface 10a of toroidal support 10, a diffusion interspace 19 is created which is filled with fluid under pressure.

Pressurized-fluid admission may be provided to be preceded by a starting performing step, aiming at causing an initial detachment of the inner surface of tyre 7 from toroidal support 10 at its radially outer portion 9. This performing step can be carried out by preliminary admission into moulding cavity 6 of a working fluid consisting of nitrogen for example, fed at a pressure included between 3 and 5 bar for example, and at all events lower than that of the fluid under pressure admitted during the pressing step.

Subsequently, admission of the pressurized fluid is carried out so as to fix the final expansion of radially outer portion 9 of tyre 7, bringing said portion into thrust relationship against the inner walls of moulding cavity 6 defined by sectors 5a, 5b.

Simultaneously, the pressurized fluid is drawn out of the lower portion of moulding cavity 6 through one or more discharge shanks 20 connected to the lower portion itself close to inner circumferential edges 7b of tyre 7.

Thus, along the inner surface of toroidal support 10 and in diffusion interspace 19, a stream of fluid under pressure moving from the upper to the lower portions of moulding cavity 6 is created, so that an efficient and homogeneous administration of heat to tyre 7 is ensured.

In more detail, the pressurized fluid distributed from admission nozzles 15 runs along an upper section of guide duct 16 until it comes close to the first series of feeding channels 17a. Part of the pressurized fluid reaches diffusion interspace 19 through feeding channels 17a of the first series advantageously having an orientation in harmony with the flow direction of the fluid itself along guide duct 16. The remaining part of the pressurized fluid continues its motion via guide duct 16, along the inner surface of toroidal support 10 in the direction of the lower portion of moulding cavity 6. The fluid stream passing through feeding channels 17b, 17c belonging to the second and third series promotes removal of fluid under pressure from diffusion interspace 19, by Venturi effect.

Thus an efficient exchange of the fluid under pressure in diffusion interspace 19 is ensured, which will bring about continuous removal of the condensate tending to be formed therein during the curing process.

In the pressing step, diffusion interspace 19 preferably has an extension included between 3 mm and 14 mm, measured between inner surface 7c of tyre 7 and outer surface 10a of toroidal support 10, at least close to an equatorial plane of the tyre coincident with equatorial plane X-X of moulding cavity 6.

It is also preferably provided that the amount of the expansion imposed to tyre 7 should involve a stretching of the belt structure of same with an increase in the circumference thereof included between 1% and 3.5%, measured at equatorial plane X-X of the tyre itself.

Advantageously, this expansion does not involve any abnormal tensioning of the cords forming the tyre carcass structure, particularly at side portions 8 thereof, firmly held between cheeks 4a, 4b and toroidal support 10. Tensioning and consequent stretching of the carcass and belt cords is in fact concentrated at radially outer portion 9 of tyre 7.

The pressurized fluid admitted to diffusion interspace 19 during the pressing step can consist of nitrogen or another inert gas, for example.

However, in one preferential embodiment, in addition to or in place of the inert gas, preferably overheated steam is provided to be employed, at a temperature preferably included between 170° C. and 210° C., fed at a gradually increasing pressure until a value included between 16 and 30 bar, preferably of about 18 bar. Under this circumstance the pressurized fluid sent to feeding channels 17a, 17b, 17c for tyre moulding also partly or completely performs the function of heating fluid for transmitting the necessary heat to the tyre for vulcanization of same.

Primary duct 13, admission nozzles 15, guide duct 16 and feeding channels 17a, 17b, 17c, together with further canalizations 22a, 22b, 21a, 21b close to cheeks 4a, 4b and to sectors 5a, 5b of mould 2 fed with steam under pressure at high temperature, also perform the function of heating devices for the walls of mould 2 in order to administer the necessary heat to tyre 7, for molecular crosslinking of same even from the outside towards the inside.

In accordance with a further aspect of the invention, before admission of fluid under pressure, a treatment of the inner surface of tyre 7 is preferably carried out to prevent steam under pressure, above all in the starting steps of the vulcanization cycle, from permeating through the green elastomer material of which the tyre is made. In more detail, to this purpose the present method involves the arrangement of at least one thin prevulcanized layer (liner) of impermeable blend on the inner surface of the tyre. Advantageously, the prevulcanized liner (not shown in the drawings) can be directly formed on toroidal support 10 during a step preceding manufacturing of tyre 7 on the toroidal support itself, or applied in the form of a skim coat to outer surface 10a of toroidal support 10.

Further specifications as regards the liner's composition and features are described in the European patent application No. 98830696.5 in the name of the same Applicant, to which it is possible to refer for further explanations.

The invention achieves important advantages.

In fact, the possibility of manufacturing the tyre directly on a rigid toroidal support ensures high features to the tyre in terms of geometric precision and structural uniformity.

Employment of a rigid toroidal support during the moulding and curing step enables a perfect centering of the tyre within the vulcanization mould to be achieved, and allows a greater control of the geometric and structural features of the tyre itself during the expansion step as compared with traditional processes using inflatable vulcanization bladders. This geometric and structural control is also further improved by an efficient anchoring of side portions 8 between cheeks 4a, 4b and toroidal support 10, as previously described, without any risk of flash formation due to leakage of the elastomer material at the beads, not even during the initial steps of the moulding and curing process.

In addition, admission of steam under pressure and at a given temperature to the diffusion interspace formed between the toroidal support and the inner surface of the tyre ensures a greater transmission of heat to the tyre, which transmission is not hindered by bodies of elastomer material such as the vulcanization bladders of the known art, and is more efficient than that obtainable by contact with solid bodies such as the toroidal support itself.

Use of a toroidal support during the vulcanization step further offers the possibility of greatly reducing the volume taken up by steam within the tyre so that vulcanization is achieved with greatly reduced steam amounts, as compared with the known art. A further reduction in the steam amount to be used is achieved due to the forced pressurized-fluid admission to the guide duct defined between filling structure 18 and the inner surface of toroidal support 10.

Admission of steam or another fluid under pressure between the toroidal support and the inner tyre surface also enables appropriate pre-loading forces to be produced, through tyre expansion, in the inner reinforcing structures of the tyre itself, which condition is often sought for, in order to achieve given behavioural qualities.

In particular, advantageously the invention makes it possible to cause a stretching with consequent pre-loading forces in the belt structure of the tyre, without imposing too much tensioning to the cords forming the ply or plies belonging to the carcass structure, above all at the sidewall regions.

It is to be noted that arrangement of a guided path for steam or another fluid under pressure along the inner surfaces of the toroidal support, as well as the particular orientation of feeding ducts 17a, 17b, 17c ensures an excellent steam exchange within diffusion interspace 19 and, consequently, an efficient removal of the water drops that are likely to be formed by condensation on the inner tyre surfaces following heat transmission carried out by steam. This aspect is particularly advantageous because the presence of water drops on the inner surfaces of the tyre would be dangerous for achievement of an efficient heat transmission.

Arrangement of a pre-cured elastomer layer on the inner surface of the tyre also eliminates the risk that a direct contact of steam with the inner surfaces of the tyre may cause diffusion of water particles in the layers of the green blend, above all during the initial steps of the vulcanization process.

Many modifications and variations may be made to the invention as described. For instance, diffusion interspace 19 may be provided to be at least partly defined by a surface lowering arranged on outer surface 10a of toroidal support 10. In this case too, due to admission of fluid under pressure, an expansion of tyre 7 increasing the volume of diffusion interspace 19 is achieved.

The invention claimed is:

1. An apparatus for moulding and curing tyres for vehicle wheels, comprising:
    a toroidal support arranged to engage a tyre being processed, the toroidal support having an outer surface substantially mating with an inner surface of the tyre;
    a vulcanization mould arranged to receive the toroidal support carrying the tyre within a moulding cavity having a holding space delimited between the outer surface of the toroidal support and walls of the moulding cavity;
    pressing devices for pressing an outer surface of the tyre against the walls of the moulding cavity;
    heating devices for transmitting heat to the tyre enclosed in the moulding cavity; and
    at least one guide duct extending along an inner surface of the toroidal support;
    wherein, under a closed condition of the vulcanization mould, the holding space has radially-inner portions and a radially-outer portion, wherein the radially-inner portions have shapes and sizes substantially corresponding to shapes and sizes of respective side portions of the tyre, and wherein the radially-outer portion has radial dimensions greater than radial dimensions of a radially-outer portion of the tyre, and
    wherein the at least one guide duct is confined between the inner surface of the toroidal support and a filling structure fastened to the inside of the toroidal support.

2. The apparatus of claim 1, wherein the pressing devices comprise channels for feeding fluid under pressure which are formed through the toroidal support and open onto the outer surface of the toroidal support.

3. The apparatus of claim 1, wherein, when the vulcanization mould is closed, the holding space has a greater volume than a volume taken up by the tyre.

4. The apparatus of claim 2, wherein the feeding channels open into at least one interspace for diffusion of the fluid under pressure, defined in the radially-outer portion of the holding space, between the outer surface of the toroidal support and the inner surface of the tyre.

5. The apparatus of claim 1, wherein the outer surface of the toroidal support has an extension less than an extension of the inner surface of the tyre after vulcanization is completed.

6. The apparatus of claim 2, wherein the at least one guide duct directs the fluid under pressure and terminates at the feeding channels.

7. The apparatus of claim 1, wherein the filling structure has an outer surface substantially extending parallel to the inner surface of the toroidal support.

8. The apparatus of claim 1, wherein the filling structure comprises an upper portion having an outer surface substantially parallel to the inner surface of the toroidal support, and a lower portion having a base surface with an inclined orientation relative to a horizontal plane.

9. The apparatus of claim 6, wherein the pressing devices comprise circumferentially-distributed admission nozzles oriented toward an end of the at least one guide duct.

10. The apparatus of claim 9, wherein the admission nozzles are oriented toward an inlet end of the at least one guide duct disposed above an equatorial plane of the toroidal support.

11. The apparatus of claim 9, wherein the admission nozzles have an inclined orientation relative to a direction radial to a geometric axis of the toroidal support.

12. The apparatus of claim 2, comprising at least a first and a second series of the feeding channels, located at respectively opposite positions relative to an equatorial median plane of the toroidal support and oriented toward directions respectively converging away from a geometric axis of the toroidal support.

13. The apparatus of claim 1, wherein the toroidal support has at least one centering shank for engagement in a centering seating associated with the vulcanization mould for fixing positioning of the toroidal support and the tyre in the moulding cavity.

14. The apparatus of claim 13, wherein the centering shank extends along a geometric axis common to the toroidal support, to the tyre, and to the moulding cavity.

15. The apparatus of claim 2, wherein the heating devices comprise at least one duct to send a heating fluid to the feeding channels.

16. The apparatus of claim 15, wherein the heating fluid comprises a same fluid as the fluid under pressure.

17. The apparatus of claim 1, wherein the toroidal support has a structure elastically yielding in an axial direction, at least at regions corresponding to inner circumferential edges of the tyre.

18. The apparatus of claim 1, wherein the toroidal support has a structure elastically yielding in an axial direction, at least at regions corresponding to the side portions of the tyre.

19. An apparatus for moulding and curing tyres for vehicle wheels, comprising:
   a toroidal support arranged to engage a tyre being processed, the toroidal support having an outer surface substantially mating with an inner surface of the tyre;
   a vulcanization mould arranged to receive the toroidal support carrying the tyre within a moulding cavity having a holding space delimited between the outer surface of the toroidal support and walls of the moulding cavity;
   pressing devices for pressing an outer surface of the tyre against the walls of the moulding cavity;
   heating devices for transmitting heat to the tyre enclosed in the moulding cavity; and
   at least one guide duct extending along an inner surface of the toroidal support;
   wherein, under a closed condition of the vulcanization mould, the holding space has radially-inner portions and a radially-outer portion, wherein the radially-inner portions have shapes and sizes substantially corresponding to shapes and sizes of respective side portions of the tyre, and wherein the radially-outer portion has radial dimensions greater than radial dimensions of a radially-outer portion of the tyre, and
   wherein the pressing devices comprise circumferentially-distributed admission nozzles oriented toward an end of the at least one guide duct.

* * * * *